United States Patent [19]

Quanbeck

[11] 4,143,718
[45] Mar. 13, 1979

[54] EARTH WORKING TOOL AND SUPPORT ASSEMBLY THEREFOR

[76] Inventor: Sherman H. Quanbeck, Aneta, N. Dak. 58212

[21] Appl. No.: 829,714

[22] Filed: Sep. 1, 1977

[51] Int. Cl.² .............................................. A01B 61/04
[52] U.S. Cl. .................................................. 172/705
[58] Field of Search ............... 172/261, 264, 265, 266, 172/267, 268, 269, 270, 271, 705, 707, 708, 710

[56] References Cited

U.S. PATENT DOCUMENTS

| | | | |
|---|---|---|---|
| 1,982,862 | 12/1934 | Erdman | 172/271 |
| 3,480,086 | 11/1969 | Groenke | 172/710 |
| 3,493,055 | 2/1970 | Van Peursem | 172/708 |
| 3,606,928 | 9/1971 | Quanbeck | 172/265 |
| 3,981,367 | 9/1976 | Mydels | 172/265 |

FOREIGN PATENT DOCUMENTS 110989  7/1940  Australia ................................. 172/708

Primary Examiner—Richard T. Stouffer
Attorney, Agent, or Firm—Nickolas E. Westman

[57] ABSTRACT

The present invention relates to a support for an earth working tool such as a chisel plow, and more particularly to a spring loaded support which permits pivoting of the earth working tool against a resilient bias force for prevention of overstress, and which includes a mounting member that distributes the stresses on the earth working tool shank itself across a substantial length of the shank to reduce stress concentration areas and lower the maximum stresses by providing a spring backing member along the shank which carries the mounting pivot tube and also carries one end of the spring assembly.

9 Claims, 4 Drawing Figures

U.S. Patent        Mar. 13, 1979        4,143,718
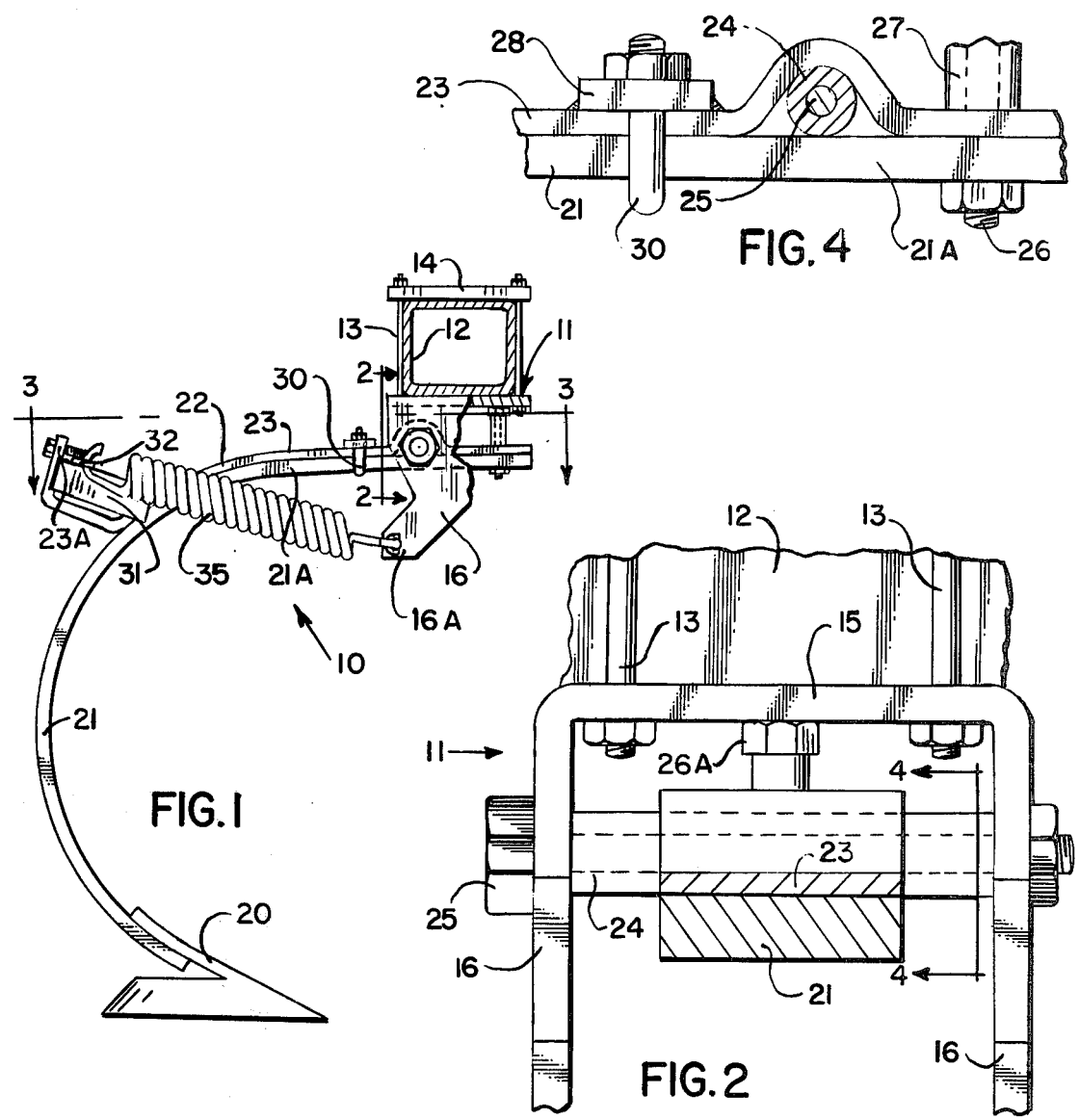
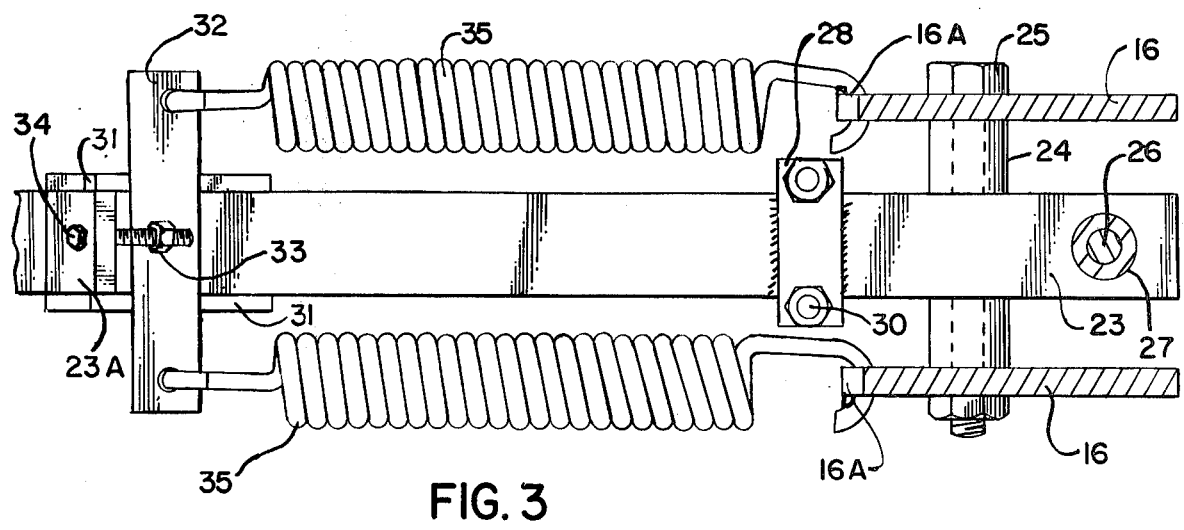

EARTH WORKING TOOL AND SUPPORT ASSEMBLY THEREFOR

BACKGROUND OF THE INVENTION

1. Field of the Invention

The present invention relates to supports for earth working tools such as the shanks used for chisel plows.

2. Prior Art

Various spring loaded earth working tools have been advanced in the prior art. Desirable features of such tools are shown in my own U.S. Pat. Nos. 3,606,928 and 3,782,481, but as development increases, and cost reductions become necessary, it has become desirable to reduce stress levels in the shanks themselves in order to reduce breakage of shanks and at the same time provide for low cost manufacture.

SUMMARY OF THE INVENTION

The present invention relates to an earth working tool shank support comprising a main pivot bracket that clamps onto a tool bar or similar mobile frame, and which mounts an earth working tool spring shank for pivotal movement. The pivot tube of the present invention is mounted onto a backing member that is formed into substantially the same curvature as the main spring shank mounting the earth working tool. The backing member is bolted to the shank with a single bolt at the upper end of the shank and is clamped with a U bolt to the earth working tool shank at one other location near the pivot tube.

The backing member curves rearwardly and downwardly along the upper part of the earth working tool spring shank in locations where the highest stress levels occur. The backing member has an upwardly bent portion that incorporates the support for a pair of springs. The second ends of the springs are attached directly to the main pivot bracket below the pivot tube, and to the rear of the pivot. The spring ends are therefore arranged so that as the earth working tool moves away from its working position, the springs are stretched to resist such pivoting and also the effective lever arm of the spring action reduces. The reducing lever arm means that the springs extend less for each degree the tool pivots upwardly as the tool moves away from working position. The reducing lever arm tends to reduce overstressing of the springs as the earth working tool pivots to a substantial degree.

The backing member is made so that it carries load as the shank flexes rearwardly under load. The backing member thus tends to distribute the stress along the shank and reduce any tendency of the shank to have stress concentration areas as well as limiting the maximum stress of the shank.

The U bolt that is used for clamping the spring shank to the backing member is positioned closely adjacent the pivot, and thus both the backing member and the spring shank will be free to flex under loads for lively spring action, while distributing the higher stresses more evenly.

Additionally, the spring support that is formed as part of the backing member is simple to make, and provides for adequate adjustment of the springs in a simple, low cost manner.

The pivot tube that is utilized with the pivoting shank is of substantial length to provide low load factors and thus increase the life of the pivoting members, and resist wear and breakage.

The single bolt that attaches the forward ends of the spring shank member to the backing member is provided with a spacer to space the head of the bolt properly to permit the bolt to serve as a stop member that abuts against a portion of the pivot bracket when the earth working tool is in its working position. By changing the length of the spacer, or by putting in shims, such as washers, the stopped working position of the earth working tool can be adjusted to suit existing conditions.

Therefore, a reliable, low cost, and wear resistant mounting member for an earth working tool is provided.

BRIEF DESCRIPTION OF THE DRAWINGS

FIG. 1 is a side elevational view of an earth working tool having a backing or support member made according to the present invention;

FIG. 2 is an enlarged fragmentary sectional view taken as on line 2—2 in FIG. 1;

FIG. 3 is a top plan view of the earth working tool taken as on line 3—3 in FIG. 1; and FIG. 4 is a fragmentary sectional view taken as on line 4—4 in FIG. 2.

DESCRIPTION OF THE PREFERRED EMBODIMENT

In FIG. 1, an earth working tool assembly illustrated generally at 10 includes a main inverted U shaped pivot housing 11 which is attached to a square or rectilinear tool bar frame member 12 through the use of bolts 13, which clamp the bracket to the undersurface of the frame member 12 using a top clamp 14 that is positioned above the tool bar frame member 12. The pivot bracket 11 as shown has a base plate 15 that fits against the lower surface of the tool bar frame member 12.

The base 15 carries laterally spaced downwardly depending legs 16 which form the inverted U shaped bracket. As shown there are four of the bolts 13, two on the front side of the frame member 12 and two on the rear side.

The earth working tool 20 is mounted onto a rectangular cross section spring steel shank 21 that as shown curves upwardly and forwardly from the earth working tool and has a relatively straight, forwardly extending section 21A that extends between the legs 16,16 of the bracket 11. The shank 21 is clamped to a shank backing and support member 22. The backing and support member 22 includes a shank backing portion 23 that is shaped to generally conform to the shank 21. The shank backing portion extends over part of the curve of the spring shank 21.

The shank backing portion 23 of the backing member 22 has a pivot tube 24 welded thereto in a recess or pocket formed by indenting the backing member as shown in FIG. 4.

The pivot tube 24 extends laterally out beyond the sides of the backing member, and fits between the legs 16,16. A suitable pivot bolt 25 is used for attaching the pivot tube and shank to the legs 16,16 and it can be seen that the pivot tube 24 has a substantial length to provide a large wear surface and also to give great resistance to sideways twisting of the shank.

The backing member 22 is used for supporting and holding the shank 21 in place. At the forward end of the shank portion 21A there is a single bolt 26 that passes through the forward portion of the shank backing portion 23 and through the shank portion 21. The head of bolt 26 is spaced upwardly through the use of a spacer 27, and the bolt is clamped tightly so that the backing portion 23 and the shank 21 are securely held together at the forward end.

Immediately behind the pivot tube 24, the backing portion 23 has a cross plate 28 welded thereto, and a U bolt 30 is passed under the shank portion 21A and through provided openings in the plate 28 and then clamped in place to tightly clamp the shank 21 against the backing portion 23 and hold the shank tightly against this backing portion.

The shank backing portion 23 as shown is of substantially the same width as the shank itself, but is of thinner vertical dimension or thickness. In any event the backing portion 23 rests against the spring shank 21 and the two parts 21 and 23 engage each other under a resilient bearing load only. The bracket part 23A of the shank backing member 22 is bent upwardly from portion 23 as shown, and suitable side braces 31 are utilized between this backing portion 23 and the bracket part 23A for strengthening the upright bracket part 23A and also for slidably supporting a cross bar 32 that rests on these side members 31. The cross bar 32 in turn carries a nut assembly 33 which has a bolt 34 threadably mounted therethrough. The bolt 34 provides for adjustment of the plate 32 forwardly and rearwardly to provide for adjustment of a pair of springs 35,35.

The springs 35 are mounted so that one is on each side of the shank assembly as shown in FIG. 3 and each spring is hooked into a respective opening of the cross bar 32. The opposite end of each of the springs 35 is hooked into a lower end portion 16A of one respective leg 16. The springs 35 are selected so that they are under tension to hold the head of the bolt 26, which is indicated at 26A, tightly against the undersurface of the cross bar 15. This can be seen in FIG. 1, and also in FIG. 2. The bolt head thus provides a stop under the urging of the springs 35, when the earth working tool is in its working position. The bolt 34 can be adjusted back and forth to change the tension of the springs and thus the load on the earth working tool.

When the unit is in use, loads on the earth working tool 20 down near the lower end of the shank 21 will cause the shank to tend to pivot about the axis of the bolt 25 in clockwise direction in FIG. 1, and the springs 35 will resist such pivoting under tension force. The shank will pivot away from its stopped position shown in FIG. 1 to permit the earth working tool to pivot upwardly to clear obstacles in the field, and as it does so, the stresses in the shank 21 will be distributed along the length of the shank backing portion 23 because the shank 21 will tend to flex, and as it flexes more and more load will be transferred to the backing member.

This action will tend to distribute the stresses in the shank portion 21 along a greater length of shank and will prevent highly stressed areas, such as where the shank 21 is clamped to a bracket.

The stress on the shank itself will be distributed relatively uniformly and the shank will tend to absorb higher shock loads without failure. The shank backing portion 23 is bent to form an upright leg for use of the spring mounting and adjustment bolt 34. Thus, the spring shank backing member also forms an adjustable anchor for one end of the springs as a unitary member. The U shaped bracket 11 provides an anchor for the opposite ends of the springs 35 at the same time it provides a stable, rugged housing for pivotally mounting the earth working tool assembly.

The shank backing portion 23 of the member 22 carries the pivot tube, and is attached to the shank at only one bolted location and one clamped location, and extends along a substantial length of the spring shank through its curved section. The curved section tends to straighten out under load on tool 20 so that the backing portion will carry part of the load from the spring shank as it straightens out and will also distribute the stresses across a longer length of the curved spring shank to prevent highly stressed localized areas.

What is claimed is:

1. A support for a pivoting earth working tool including a main mounting bracket, an earth working tool shank comprising a curved spring shank member having an upper portion and a lower portion, an earth working tool attached to said lower portion, and means to mount said upper portion to said main mounting bracket comprising a shank backing member curved to conform to a section of the upper portion of said curved spring shank member and conforming generally to at least a portion of the curved shape of said curved spring shank member, said shank backing member having a forwardly extending portion overlying the upper portion of said spring shank member, a pivot member fixedly mounted to said backing member at the the forwardly extending portion thereof, means to pivotally mount said pivot member to said main mounting bracket, means adjacent the pivot member and separate therefrom to clamp said curved spring shank member to said shank backing member to form an assembly which pivots about the axis of said pivot member relative to said main mounting bracket, and means connected to said shank backing member to hold the earth working tool in a working position including a tension spring positioned to exert resilient force tending to resist upward pivotal movement of said shank backing member and said spring shank member under load on said earth working tool, said shank backing member permitting the spring shank member to flex under load to distribute stresses along the shank backing member.

2. The combination as specified in claim 1 and means connecting said spring to said shank backing member including a portion of the shank backing member bent upwardly away from said spring shank member to the rear of said pivot, a spring carrier mounted on said upright member, one end of said spring being mounted on said spring carrier, and an opposite end of said spring being mounted to said main mounting bracket.

3. The combination as specified in claim 2 wherein said main mounting bracket comprises an inverted U shaped member having downwardly depending legs positioned on opposite sides of said spring shank member and shank mounting member, the opposite end of said spring being connected to lower portions of said downwardly depending legs.

4. The combination as specified in claim 1 wherein said pivot tube is welded to said backing member, and said shank backing member and spring shank member are clamped together with bolted connections only.

5. The combination as specified in claim 4 wherein said bolted connections comprise a single bolt adjacent the forward leading end of said shank member passing through said backing member and said shank, and a U bolt clamping said spring shank member against said shank backing member rearwardly of and adjacent said pivot tube.

6. The combination as specified in claim 1 and means for mounting said spring to said shank comprising an upright portion attached to said shank backing member and extending upwardly therefrom, a pair of guide plates mounted between said upright portion and other portions of said shank backing member and having upwardly facing edges, a cross plate mounted on said upwardly facing edges, said spring means comprising a pair of springs, one mounted adjacent each side of said spring shank member, first ends of said springs being attached to opposite sides of said cross plate, respectively, and means to threadably adjust said cross plate for movement toward and away from said upright member to adjust the tension in said springs.

7. The combination as specified in claim 5 wherein said single bolt holding said spring shank member and shank backing member together has a head portion, and means mounting said head portion in a desired relationship to the main mounting bracket whereby said head will abut against said main mounting bracket with said earth working tool in a working position.

8. An earth working tool shank assembly including a main mounting bracket adapted to be mounted on a frame member, an earth working tool shank comprising a curved spring shank member having an upper attachment portion, and a lower portion curving downwardly and thence forwardly from the upper portion, an earth working tool attached to said lower portion, and means to mount said upper portion to said main mounting bracket comprising a shank backing member curved to substantially conform to the upper portion of said spring shank member, a pivot tube fixedly attached to forward portions of said shank backing member, means to clamp said shank backing member contiguous to upwardly and rearwardly facing portions of said spring shank member to tend to resist flexing of said spring shank member caused by loads on said earth working tool, comprising a bolt member passing through forward end portions of the spring shank member and said shank backing member ahead of said pivot tube, and a clamp on the exterior of said spring shank member and shank backing member adjacent to and rearwardly of the pivot tube, said spring shank member being otherwise unattached from said shank backing member, means to pivotally mount said pivot tube to said main mounting bracket about a generally horizontal pivot, and spring means connected between said backing member and said main mounting member positioned to exert a resilient force tending to resist upward pivotal movement of said backing member and said spring shank member under working load on said earth working tool.

9. An earth working tool shank assembly for attachment to a frame member including a main mounting bracket, an earth working tool shank comprising a curved spring shank member having an upper attachment portion and a lower portion curving downwardly from the upper portion, an earth working tool attached to said lower portion, and means to mount said upper portion to said main mounting bracket comprising a shank backing member having a forward portion and having a main portion curved to substantially conform to at least sections of the upper portion of said spring shank member, a pivot member fixedly attached to said forward portions of said shank backing member, means to clamp said shank backing member contiguous to upwardly and rearwardly facing surfaces of said spring shank member to tend to resist flexing of said spring shank member caused by loads on said earth working tool, said means to clamp comprising a bolt member passing through the forward end of the spring shank member and the shank backing member ahead of the pivot member, and a clamp member clamping the spring shank member and shank backing member together rearwardly of said pivot member, means to pivotally mount said pivot member to said main mounting bracket about a generally horizontal pivot axis, said shank backing member further having an upright portion spaced from said main portion of said shank backing member, a pair of reinforcement guide plates mounted between said upright portion and the main portion of said shank backing member on opposite side edges of the shank backing member, a cross plate movably mounted on said reinforcement guide plates, a pair of springs, one mounted adjacent each side of said shank, first ends of said springs being attached to opposite ends of said cross plate, respectively, and second ends of said spring being connected to said main mounting bracket in position to exert resilient force tending to resist upward pivotal movement of said shank backing member and said spring shank member under load on said earth working tool, and means to adjust said cross plate for movement toward and away from said upright portion to thereby adjust the tension in said springs.

* * * * *